(12) United States Patent
Adams

(10) Patent No.: US 8,534,706 B2
(45) Date of Patent: Sep. 17, 2013

(54) VEHICLE FRAME

(71) Applicant: Herb Adams, Piney Flats, TN (US)

(72) Inventor: Herb Adams, Piney Flats, TN (US)

( * ) Notice: Subject to any disclaimer, the term of this patent is extended or adjusted under 35 U.S.C. 154(b) by 0 days.

(21) Appl. No.: 13/632,345

(22) Filed: Oct. 1, 2012

(65) Prior Publication Data

US 2013/0082483 A1 Apr. 4, 2013

Related U.S. Application Data

(60) Provisional application No. 61/542,316, filed on Oct. 3, 2011.

(51) Int. Cl.
*B62D 21/00* (2006.01)

(52) U.S. Cl.
USPC ...... 280/785; 280/781; 296/205; 296/203.01; 180/311

(58) Field of Classification Search
USPC .................. 280/781, 785; 296/205, 203.01; 180/311
See application file for complete search history.

(56) References Cited

U.S. PATENT DOCUMENTS

| | | | | |
|---|---|---|---|---|
| 5,496,067 | A | * | 3/1996 | Stoll et al. ............... 280/784 |
| 6,378,268 | B1 | * | 4/2002 | Guyomard ............... 280/800 |
| 7,614,658 | B2 | * | 11/2009 | Yamada ................... 280/784 |
| 7,669,688 | B2 | * | 3/2010 | Yamaguchi et al. ...... 180/312 |
| 7,695,056 | B2 | * | 4/2010 | Hanson et al. ........... 296/204 |
| 8,136,864 | B2 | * | 3/2012 | Purcell .................... 296/108 |
| 8,210,603 | B2 | * | 7/2012 | Favaretto ................. 296/204 |
| 8,240,748 | B2 | * | 8/2012 | Chapman ............. 296/193.04 |
| 8,276,982 | B2 | * | 10/2012 | Favaretto ................. 296/204 |
| 8,376,439 | B2 | * | 2/2013 | Kuriakose et al. ....... 296/39.2 |
| 2005/0140131 | A1 | * | 6/2005 | Smith ...................... 280/781 |
| 2007/0251751 | A1 | * | 11/2007 | Ball et al. ................ 180/312 |
| 2011/0175337 | A1 | * | 7/2011 | Favaretto ................. 280/781 |

* cited by examiner

*Primary Examiner* — Nicole Verley
(74) *Attorney, Agent, or Firm* — Gifford, Krass, Sprinkle, Anderson & Citkowski, P.C.

(57) ABSTRACT

A vehicle frame having at least one elongated truss. The truss is elongated and generally triangular in cross sectional shape. Consequently, the truss includes three side walls. Each of the side walls is constructed from a sheet material, such as sheet metal.

5 Claims, 1 Drawing Sheet

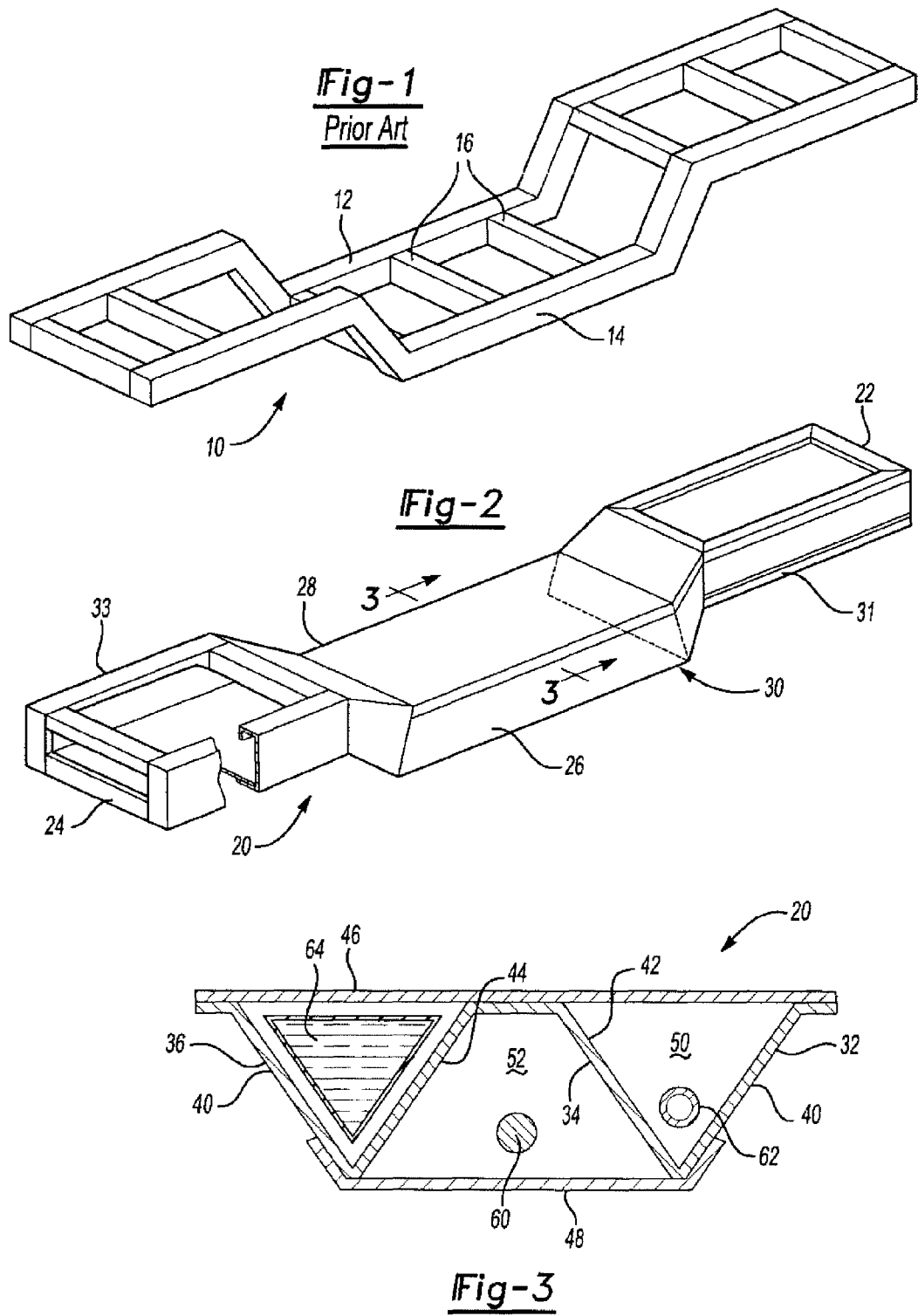

VEHICLE FRAME

CROSS REFERENCE TO RELATED APPLICATIONS

This application claims priority of U.S. Provisional Application 61/542,316 filed Oct. 3, 2011, the contents of which are incorporated herein by reference.

BACKGROUND OF THE INVENTION

I. Field of the Invention

The present invention relates generally to vehicle frames and, more particularly, to an improved vehicle frame construction.

II. Description of the Prior Art

Many vehicles, such as truck or automotive vehicles, utilize a ladder frame to provide the structural support needed to support all of the loads during the operation of the vehicle. An exemplary model of such a prior art vehicle frame 10 is illustrated in FIG. 1.

With reference then to FIG. 1, the prior art vehicle frame 10 includes longitudinally extending and elongated framing members 12 and 14 which extend along opposite sides of the vehicle. The frame 10 also includes a number of cross members 16 which extend laterally between and connect to the framing members 12 and 14. Any conventional method, such as welding, may be used to secure the cross members 16 to the framing members 12 and 14.

In many types of vehicles, the frame 10 must be sufficiently strong to support vehicle loads and the ability to withstand the vertical loads is known as "beaming strength" because the entire frame acts as a beam and is designed to absorb vertical loads. Traditionally, designers have increased the beaming strength by increasing the size and/or number of the cross members 16 and framing members 12 and 14.

Although the previously known vehicle frames have proven adequate in absorbing vertical loads, the ladder frames in such vehicles are inadequate at absorbing torsional loads. Furthermore, many vehicles require torsional stiffness in order to provide the required structure for a solid ride and better handling while the vehicle is in use.

In addition, even though the use of stronger or heavier frame members 12 and 14 and cross members 16 does provide the required strength to carry heavier loads, such a frame design also adds to the overall weight of the frame. Increasing the weight of the frame undesirably decreases the gas economy and vehicle acceleration and increases the costs.

SUMMARY OF THE PRESENT INVENTION

The present invention provides a vehicle frame which overcomes the above-mentioned disadvantages of the previously known vehicle frames.

In brief, in the vehicle frame of the present invention the vehicle frame is constructed from at least three elongated trusses. Each truss includes three sides and is generally triangular in cross sectional shape. The truss, furthermore, is constructed from sheet material, such as sheet metal, and secured together in any conventional fashion, such as welding, in order to form a closed triangular shape.

Three or more trusses are positioned laterally adjacent each other to form the frame. Additionally, the side-by-side trusses share a common wall.

In practice, the triangular trusses constructed from sheet material exhibit superior torsional strength as well as beaming strength. Additionally, the frame according to the present invention is lighter in weight than a conventional ladder frame for the same vehicle.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which:

FIG. 1 is an elevational view of a prior art ladder frame;

FIG. 2 is a view similar to FIG. 1, but illustrating a preferred embodiment of the frame of the present invention; and FIG. 3 is a sectional view taken along line 3-3 in FIG. 2 and enlarged for clarity.

DETAILED DESCRIPTION OF A PREFERRED EMBODIMENT OF THE PRESENT INVENTION

With reference now to FIGS. 2 and 3, a preferred embodiment of the vehicle frame 20 according to the present invention is shown. As best shown in FIG. 2, the vehicle frame 20 includes a front 22, rear 24, and two sides 26 and 28. A midsection 30 of the frame 20 extends between and connects the front and rear portions 31 and 33, respectively, of the frame 20 together.

The entire vehicle frame 20 is designed to support all of the other components (not shown) of the vehicle. These components will, of course, differ depending upon the type of vehicle.

Although the front portion 31 and rear portion 33 of the overall frame 20 may be constructed using conventional ladder beam construction, the middle section 32 of the frame is constructed differently. More specifically, the middle section 30 of the frame 20 is constructed from three or more elongated trusses 32, 34, and 36 which extend longitudinally between the front portion 31 and rear portion 33 of the frame and are positioned laterally side by side with each other. Each truss 34, furthermore, is constructed from a plurality of vertically extending panels 40-44, a top panel 46, and a bottom panel 48 that are arranged in a generally triangular configuration. Two of the panels 42 and 44 in the center truss 34 are shared with the adjacent two outer trusses 32 and 36.

The panels 40, 42, and 46 are preferably made of sheet metal and attached to each other by welding although other attaching methods, such as adhesive, may alternatively be used.

A vehicle frame constructed in accordance with the present invention exhibits not only exceptional vertical load resistance, but also exceptional resistance to torsional loading and torsional distortion. Furthermore, since only a relatively thin metal, such as sheet metal, is used to form the panels 40-46, the overall weight of the vehicle frame is substantially less than a beam and ladder frame constructed of a similar size.

With reference particularly to FIG. 3, an additional advantage of the present invention is that the panels 40-46 form three longitudinally extending channels 50, 52, and 54, each of which is generally triangular in shape. These channels 50-54 may be used to house various components of the vehicle. For example, the channel 50 could house a transmission shaft 60, the channel 50 could house an exhaust pipe 62, while a vehicle fuel tank could be positioned within the third channel 54. Such a construction would provide a very safe construction for the fuel tank 64 since the fuel tank 64 would be protected on all sides by the panels.

The reason that the triangular trusses exhibit superior stiffness is that the panels which form the trusses are loaded in shear.

Having described my invention, it can be seen that the present invention provides a highly effective yet inexpensive and lightweight frame construction for a vehicle. Having described my invention, however, many modifications thereto will become apparent to those skilled in the art to which it pertains without deviation from the spirit of the invention as defined by the scope of the appended claims.

I claim:

1. An automotive frame comprising:
   a front section,
   a rear section,
   a middle section extending longitudinally from said rear section and said front section and connecting said front section and said rear section together,
   said middle section comprising two outer trusses and one central truss, said trusses extending longitudinally from said rear section to said front section and being positioned laterally adjacent each other,
   wherein said outer trusses extend along opposite sides of the frame,
   wherein each truss has at least three sides and is generally triangular in cross sectional shape, each side of each truss being formed from a flat panel, and
   wherein one side of said central truss forms one side of one outer truss and a second side of said central truss forms one side of the other outer truss.

2. The automotive frame as defined in claim 1 wherein said trusses form a flat upper surface extending from one side of the frame to the other side of the frame.

3. The automotive frame as defined in claim 2 wherein said flat upper surface is a one piece construction formed from a single metal panel.

4. The automotive frame as defined in claim 1 wherein said panel comprises a metal panel.

5. The automotive frame as defined in claim 1 wherein an interior of said central truss forms a channel dimensioned to receive a drive shaft.

* * * * *